Patented Aug. 9, 1938

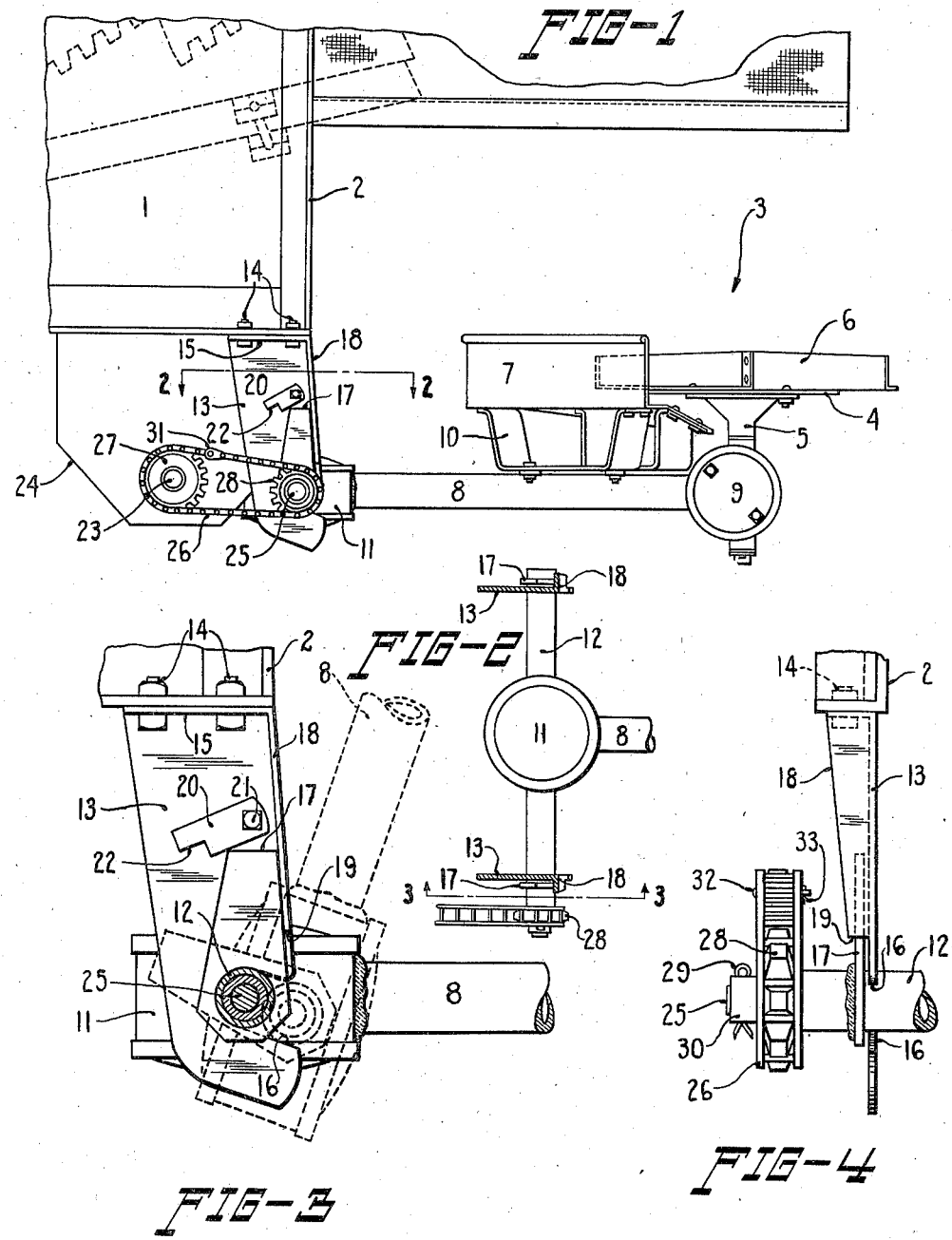

2,126,121

UNITED STATES PATENT OFFICE 2,126,121

STRAW SPREADER ATTACHMENT

Lloyd Luellen, Huntington, Ind., assignor to Deere & Company, Moline, Ill., a corporation of Illinois Application June 15, 1936, Serial No. 85,267

8 Claims. (Cl. 275—8)

The present invention relates generally to straw spreading attachments for agricultural implements and more particularly to a readily detachable straw spreader for a harvester thresher.

When operating in territories where there are numerous small fields of grain, it is highly desirable that the harvester thresher be provided with a straw spreader attachment which can be easily connected to the implement for spreading straw in certain fields but which can be readily removed for operation in other fields in which it is desired to windrow the straw.

The principal object of this invention is to provide a straw spreading device that is easily and quickly attachable and detachable. Other objects will be made apparent to those skilled in the art by a consideration of the following description in which reference is made to the drawing which is appended hereto.

In the drawing—

Figure 1 is a fragmentary elevation of an agricultural implement, such as a harvester thresher, showing a straw spreading device embodying the principles of my invention;

Figure 2 is a fragmentary sectional plan view showing certain details of the supporting and attaching means as viewed along the line 2—2 of Figure 1;

Figure 3 is an elevation showing the details of one of the supporting brackets and the manner in which the device cooperates therewith; and, Figure 4 is an end elevation of the supporting bracket and cooperative parts shown in Figure 3.

Referring to the several drawings, reference numeral 1 indicates in its entirety an agricultural implement, as for example a harvester thresher. 2 indicates the structural frame of the implement. The straw spreading attachment, indicated by 3, is supported usually at the rear end of the implement in a manner to be described later, and consists generally of a rotatable plate 4 mounted on a vertically disposed spindle 5 having a plurality of radially extending, vertically disposed blades 6. A deflecting shield 7 is disposed adjacent to the rotatable spreader and operates cooperatively therewith. For a more complete description of this type of spreading device, reference is hereby specifically made to United States Patent 2,010,287, issued August 6, 1935 to R. L. Anderson.

The spreader 3 is mounted at the end of a tubular arm 8, which is preferably horizontal, or substantially so, during operation. The spindle 5 is operatively connected by suitable gearing within a gear box 9 to a shaft (not shown) disposed within the arm 8, as is explained in the above-mentioned patent. The deflecting shield 7 is also supported on the arm 8 by suitable brackets 10. The spreader arm 8, which preferably extends longitudinally rearwardly of the implement frame 2, is supported at its forward end on a housing 11 into which it is welded or otherwise suitably connected. The housing 11 is disposed intermediately of a hollow shaft 12, which extends transversely of the frame 2, and is supported at each end by a bracket 13 which is connected to the implement frame 2, such as by bolts 14. Each of the brackets 13 is substantially vertically disposed and has a horizontal flange 15 at its upper end to which the bolts 14 are attached.

The web portion of the bracket 13 is provided with an open-ended slot 16 which extends at an upward angle forwardly from the rear edge of the bracket. The width of the slot is made slightly larger than the outside diameter of the hollow shaft 12 so that the shaft 12 may be easily inserted into the slot.

Rigidly fixed upon the shaft 12 are a pair of locking bars 17, as for instance by welding, shown in the drawing. One of these locking bars is disposed in cooperation with each of the brackets 13, respectively, and is adapted to engage a flange 18 on the rear edge of the bracket 13 when the spreader-carrying arm 8 is in operating position and as heretofore explained, is substantially horizontal. The weight of the spreader 3 thus sets up a moment which is resisted by the locking bar 17 bearing against the flange 18, which not only acts to hold the arm 8 horizontal, but tends to force the shaft 12 deeper into the slot. The upward slant of the slot aids in holding the shaft 12 in the slot when the spreader is in this position.

In order to disengage the locking bars 17 from the flange 18 the shaft 12 must be rotated counterclockwise, as seen in Figures 1 and 3, by raising arm 8 to a substantial angle above the horizontal position, as shown by dotted lines in Figure 3. Since the flange 18 terminates at its lower end 19 appreciably above the slot 16, it is clearly evident that when the spreader is in this position the shaft may be slid out of the slot 16 and the locking bars 17 will easily pass under the lower end 19 of the flange 18. Conversely, the spreader may be attached by holding it at such an angle above the horizontal and inserting the shaft 12 within the slots 16 by passing the locking bar under the end of the flange 18, after which the spreader can be rotated around the longitudinal axis of the shaft 12 to the horizontal position as shown in Figure 1.

The spreader may be raised to an intermediate position so that it will not strike obstructions on the ground during transport, and held in that position by a dog 20 which is pivoted to the bracket 13 by means of a bolt 21. The dog has a notch 22 which engages the corner of the arm 17 when the spreader is raised to transport position. In transport position, as well as in operating position, the weight of the spreader reacts against the dog 20 to hold the shaft 12 up in the notch 16.

The spreader is actuated from a power shaft 23 supported in a bracket 24 on the frame 2. The power shaft 23 is connected with a driving shaft 25 disposed within the transverse hollow shaft 12 by means of a chain 26, which operatively connects a sprocket 27 on the power shaft 23 with a sprocket 28 which is secured to the shaft 25 by means of a cotter pin 29, inserted through aligned holes in the hub 30 of the sprocket 28 and the driving shaft 25. In order to make the chain readily detachable, so that the spreader may be removed, a suitable disconnecting link 31 is provided in the chain, which is closed by a pin 32 secured by a cotter pin 33 as shown in Figure 4. The drive shaft 25 is connected to the longitudinal operating shaft within the arm 8 by means of suitable gearing disposed within the housing 11, as is clearly shown in the aforementioned patent. Hence, the power shaft 23 operating through the chain and sprocket drive rotates the drive shaft 25, which operates through the gearing within the housing 11 to drive the operating shaft within the hollow arm 8. This rotation is transmitted to the rotor spindle 5 through gearing in the box 9 causing the spreader 3 to revolve about its vertical axis at a high rate of speed. Straw discharged from the thresher 1, falling upon the plate 4 of the spreader, is caused to be thrown radially by the vanes 6 of the spreader by reason of the centrifugal force developed by the rotation of the spreader. The deflecting shield 7 prevents straw from being thrown back into the implement or into the operating mechanism of the spreader. However, with the spreader removed, the straw is merely discharged in a windrow behind the forwardly moving implement.

I claim:

1. A straw spreading device for an agricultural implement having a frame, said device comprising in combination, a shaft, a rotatable spreader supported on said shaft but offset laterally therefrom, a locking bar fixed on said shaft, a bracket fixed to said implement frame, said bracket having an open-ended slot for receiving said shaft, and means for engaging said locking bar to resist the gravitational moment set up by said offset spreader, said moment tending to hold said shaft in said slot.

2. A straw spreading device for an agricultural implement having a frame, said device comprising in combination, a spreader rotatably mounted on an arm, said arm being supported on a hollow shaft disposed substantially at right angles to said arm, a locking bar fixed on said shaft, and a bracket member fixed to said implement frame, said bracket having an open slot for receiving said hollow shaft and a projecting portion for engaging said locking bar to hold said spreader arm substantially horizontal during operation.

3. A detachable straw spreader for an agricultural implement having a frame, said spreader comprising in combination, a shaft disposed transversely of said implement frame and supported in open-ended slots in said frame, a rotatable spreading member supported on said shaft and offset rearwardly therefrom, a locking member fixed on said shaft and adapted to engage a stop on said frame for resisting the gravitational moment set up by said offset member, said moment acting to hold said shaft in said slot.

4. A straw spreading device for an agricultural implement having a frame, said device comprising in combination, a spreader rotatably mounted on an arm, said arm being supported on a hollow shaft disposed substantially at right angles to said arm, a locking bar fixed on said shaft, and a bracket member fixed to said implement frame, said bracket having a slotted recess for receiving said shaft and means for engaging said locking bar when said arm is substantially horizontal, said shaft being removable from said bracket when said arm is pivoted around the longitudinal axis of said shaft to an appreciable angle above the horizontal.

5. A readily detachable straw spreading device for an agricultural implement having a frame, said device comprising in combination, a spreader rotatably mounted on an arm, said arm being supported on a hollow shaft disposed substantially at right angles to said arm, a locking bar fixed on said shaft, a pair of laterally spaced bracket members fixed to said implement frame, said bracket members having slotted recesses for receiving said shaft and means for engaging said locking bar when said arm is substantially horizontal, said shaft being removable from said bracket members when said arm is pivoted around the longitudinal axis of said shaft to an appreciable angle above the horizontal, a driving shaft disposed within said hollow shaft, a power shaft supported by said frame, and removable means for operatively connecting said power shaft to said driving shaft.

6. A readily detachable straw spreading device for an agricultural implement having a frame, said device comprising in combination, a hollow shaft disposed transversely of said frame, an arm having one end fixed to said shaft and extending rearwardly therefrom and substantially at right angles thereto, a rotatable spreader mounted at the other end of said arm, a pair of brackets attached to said frame for supporting said shaft, each of said brackets having an open-ended slot for receiving said shaft, a pair of locking bars fixed to said shaft, each bar being adapted to engage a portion of one of said brackets, respectively, when said arm is in horizontal operating position, for holding said arm in said operating position and for holding said shaft in said slots, said locking bars being disengaged to permit said shaft to be removed from said slots when said arm is pivoted around the longitudinal axis of said shaft to an appreciable angle above the horizontal position, a driving shaft disposed within said hollow shaft, a power shaft supported on said frame parallel to said driving shaft, a sprocket on each of said shafts, and a driving chain connecting said sprockets, said chain having a removable link to facilitate disconnection of said chain when said spreader is removed from the implement.

7. A detachable straw spreading device for an agricultural implement, said device comprising in combination, a T-shaped supporting member, a spreader rotatably mounted adjacent the end of said member, a pair of laterally spaced flanged plates fixed on said implement, each of said plates having an open-ended slot for receiving one of the arms of said supporting member, respectively, and a stop fixed to one arm of said supporting member and adapted to engage the flange of one of said plates to limit downward swinging movement of said supporting member.

8. A straw spreading attachment for a harvester thresher, comprising in combination, a pair of laterally spaced, supporting plates fixed to the frame of said combine and disposed in longitudinally extending planes, said plates having transversely aligned open-ended recesses, a transversely extending shaft adapted for insertion into said recesses, a rearwardly extending supporting arm fixed to said shaft, a spreader rotatably mounted on said supporting arm, a stop on said transverse shaft, and means on one of said supporting plates for engaging said stop to prevent downward swinging of said supporting arm beyond a substantially horizontal position.

LLOYD LUELLEN.